Figure 1:
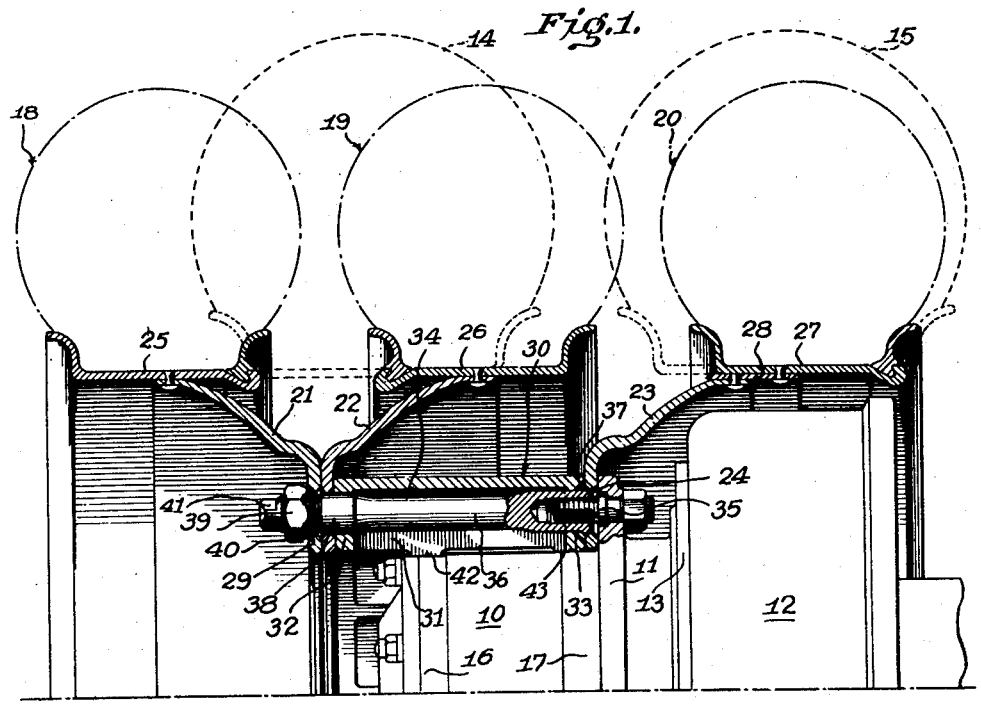

March 4, 1947.  P. E. BAKER  2,416,862

TRIPLE WHEEL

Filed June 23, 1944

INVENTOR.
Paul E. Baker
BY
ATTORNEY

UNITED STATES PATENT OFFICE 2,416,862

TRIPLE WHEEL

Paul E. Baker, Grosse Pointe Farms, Mich., assignor to The Budd Company, Philadelphia, Pa., a corporation of Pennsylvania Application June 23, 1944, Serial No. 541,774

3 Claims. (Cl. 301—36)

The invention relates to wheels and more particularly to heavy duty wheels.

It is a known expedient to demountably secure a pair of oppositely dished wheels to a hub flange to form a dual wheel. For heavy duty work such wheels require extremely large and heavy tires and their bodies have to be of relatively heavy gauge to carry the loads required of them. To avoid the use of such large and heavy tires, which in some cases are not readily available, and to avoid the relatively heavy gauge wheel bodies, which are relatively difficult to fabricate, the invention contemplates the provision of a triple wheel capable of taking the place of the heavy duty dual wheel and capable of carrying a corresponding load. Such triple wheel may be of substantially the same weight as the corresponding dual wheel because the bodies of the individual wheels of the triple wheel may be correspondingly of lighter gauge and thus of lighter weight and the tires may be correspondingly smaller, lighter and easier to fabricate and handle. Furthermore, there are instances of use, as where a very wide tread is desired, where such a triple wheel is preferable to a dual wheel for the same loading, for this and other reasons.

It is therefore an object of the invention to provide a triple wheel of this class, the elements of which may be demountably associated with either the same or a similar hub to that which ordinarily receives a pair of dual wheels and to do this without substantially increasing the weight of the wheel.

It is a further object to provide such a wheel in which the individual wheel bodies demountably associated with the hub are interchangeable, and in which the parts of the triple wheel are so disposed on the hub, that their treads are equally spaced and their combined loads are effectively carried to the hub.

These objects are achieved in large part by the provision of an adapter ring having outboard and inboard faces of substantially equal diameter and suitably reinforced and seated on the hub between the hub flange and certain of the wheel bodies of the triple wheel, and through which they are suitably spaced and demountably secured to the hub.

Also, by suitably dishing the wheel bodies the peripheral portions carrying the rims may, in conjunction with the adapter, be readily equally spaced from each other and yet be readily interchangeable with each other, which is a highly desirable manufacturing feature.

The arrangement is further such that the demountable securing means cooperates with the hub flange and the adapter to center the wheel bodies on the hub, and facilitates the mounting and demounting of the wheel bodies on the hub.

Other and further objects and advantages and the manner in which they are attained will become clearer from the following detailed description when read in connection with the drawings forming a part of this specification.

Figure 2:
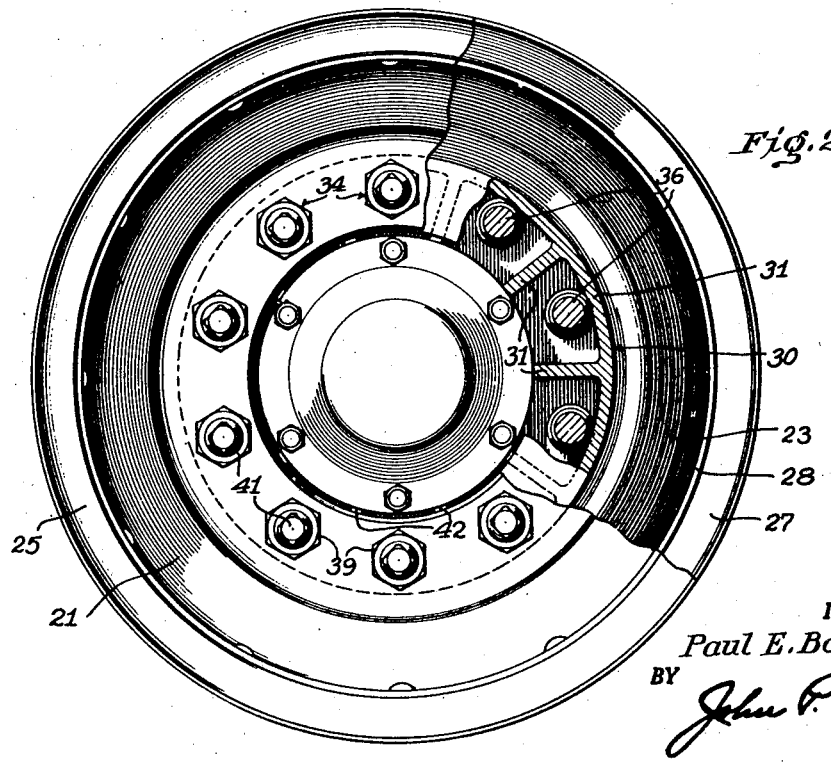

In the drawings:

Fig. 1 shows, in axial section, a triple wheel according to the invention, parts being shown in elevation and parts in outline only, and Fig. 2 is an outboard and elevational view, parts being broken away to show details which would otherwise be hidden.

In the embodiment of the invention selected for illustration, the hub is of generally conventional form having the body or barrel portion 10 and a radial bolting-on flange 11. Inboard of the flange 11 the brake drum, as 12, may be secured to second flange 13 in any conventional manner.

The hub is generally of the form for mounting heavy duty dual wheels, the relative locations of the tires and rims of which are indicated in Fig. 1, at 14 and 15, by dotted lines. Preferably, the hub body outboard of the flange 11 is provided with machined axially spaced seats 16 and 17, the seat 17 being adjacent the hub flange 11.

According to the invention, instead of mounting a pair of dual wheels on the hub with their peripheral portions in the locations indicated, a triple wheel is demountably secured to the hub, the individual wheels of the triple wheel being generally indicated in Fig. 1 by the numerals 18, 19, and 20, the tires being represented by dot and dash lines.

The disc wheel bodies of the triple wheel are generally designated 21, 22, and 23, and are of substantially the same dish and taper, so that they are interchangeable, and can all be manufactured by the same processes.

Each has an inner mounting portion extending radially, and this mounting portion is provided with a series of equally circumferentially spaced holes, as 24. To secure the proper equal spacing of the rims 25, 26 and 27, secured to the wheel bodies in the conventional manner, as by riveting, one of the wheel bodies, as the inboard one 23, in this instance is provided with an axial peripheral extension 28 riveted to its peripheral flange. By proper dishing of the wheel bodies, it is possible, however, to make all of them of identical stampings when desired.

All of the wheel bodies have the openings 24 in their mounting portions formed with reentrant conical seats, as 29, on opposite sides thereof for cooperation with the securing means as will become apparent as the description proceeds.

According to the invention, an adapter ring, designated generally by 30, is seated on the hub barrel 10, this adapter ring being hollow and having a radially outer cylindrical wall and radial end walls 32 and 33 extending inwardly therefrom. It is strongly braced by a plurality of longitudinally extending circumferentially-spaced rib walls 31 interbracing the cylindrical and end walls. Between the ribs the end walls 32 and 33 are formed with annular series of aligned openings to receive the securing means, these openings corresponding in number and spacing to the holes 24 in the wheel bodies. The end walls of the adapter form seating faces against which the wheel bodies seat.

In the embodiment shown, the mounting portion of the inboard wheel body 23 is received between the bolting-on flange 11 and the inner end wall of the adapter and the two wheel bodies 21 and 22 are arranged with their mounting portions face to face and seated against the outboard end wall 32 of the adapter.

The hub flange 11, wheel bodies 21, 22, 23 and the adapter 30 are securely clamped together by the securing means now to be described. Such securing means comprise an annular series of spaced fasteners, generally designated 34, extending through the aligned holes in the parts. Since all of these fasteners are similar, a description of one and its cooperation with the parts to be secured will suffice.

Each fastener comprises a threaded stud 35 rigidly secured to the hub flange and projecting from its outer face through the adjacent opening 24 in the inboard wheel body 23. The opening 24 is larger than the stud.

The inboard wheel body 23 is securely clamped to the hub flange 11, by threading an elongated nut 36 extending through the aligned openings in the outboard and inboard walls 32 and 33 of the adapter ring onto the adjacent stud 35. This nut has its inboard end formed with a centering and securing abutment 37 which mates with the adjacent reentrant seat 29 in the inboard wheel body 23. The portions of the nut 36 passing through the openings in the end walls 32 and 33 are enlarged over the intermediate portion thereof to form a sliding fit with said openings.

The outboard enlarged portion, as 38, extends some distance beyond the outer wall 32 of the adapter and fits the adjacent hole in the wheel body 22 to center the same in conjunction with the other fasteners. Outboard of this enlarged seating portion 38, the nut 36 is externally threaded on a somewhat reduced extension thereof which extends loosely through the adjacent hole 24 in the wheel body 21, and this body is centered and the two wheel bodies 21 and 22 are together clamped to the outboard face of the adapter ring by a second nut 39 screwed on the threaded extension of the nut 36. The nut 39 is formed with a mating abutment 40 seating in the adjacent reentrant seat 29 of the wheel body 21 and, with the other fastening means, serves both to center and secure it. At its extreme outer end the elongated nut 36 is formed with a non-circular portion 41 to receive a corresponding opening in a tool used for tightening or releasing it.

From the foregoing description, it will be seen that, when all the fastening means 34 are tightened, the wheel bodies and adapter are all securely clamped together and to the hub flange.

To avoid subjecting the fastening means to excessive bending loads, the adapter is formed with slightly inwardly extending spaced seats, 42 and 43, which slidingly fit the respective seats 16 and 17 on the hub body 10.

While a specific embodiment of the invention has beeen herein described, it will be understood that changes and modifications may be made by those skilled in the art without departing from the main features thereof and such changes and modifications are intended to be covered in the appended claims.

What is claimed is:

1. A triple wheel organization comprising a hub having a radial bolting-on flange, three disc wheel bodies each having a radially extending mounting portion provided with an annular series of equally spaced openings surrounded by reentrant seats, an adapter ring having outboard and inboard radial walls, each provided with a corresponding annular series of openings, said ring spacing certain of said wheel bodies, and means for demountably securing said wheel bodies and adapter ring together and to said hub flange, said means comprising an annular series of fastenings secured to the hub flange and extending through the aligned openings in the mounting portions of said wheel bodies and said adapter ring, each fastening comprising a threaded stud secured to said hub flange, a nut having an abutment at its inner end mating with the reentrant seat of the adjacent wheel body and adapted to be screwed onto said stud, said nut extending through the adapter and therebeyond, through the openings in the outboard radial wall of the adapter ring and the adjacent wheel body or bodies, and a second nut having an abutment mating the reentrant seat of the adjacent wheel body and adapted to be screwed onto a screw threaded portion of said first-named nut.

2. A triple wheel organization comprising a hub having a radial bolting-on flange, three disc wheel bodies each having a radially extending mounting portion provided with an annular series of equally spaced openings, an adapter ring having outboard and inboard radial faces and provided with a corresponding annular series of openings, said ring spacing certain of said wheel bodies, and means for demountably securing said wheel bodies and adapter ring together and to said hub flange, said means comprising an annular series of fastenings secured to the hub flange and extending through the aligned openings in the mounting portions of said wheel bodies and said adapter ring, each fastening comprising a threaded stud secured to the hub flange, a nut having an abutment at its inner end for engagement with the adjacent wheel body and adapted to be screwed onto said stud, said nut extending through the adapter and through the opening or openings in the wheel body or bodies adjacent the outboard radial face of said adapter, and a second nut having an abutment for engagement with the outboard wheel body and adapted to be screwed onto a screw-threaded portion of said first-named nut.

3. A triple wheel organization comprising a hub having a radial bolting-on flange, three disc wheel bodies each having a radially extending mounting portion provided with an annular series of equally spaced openings; an adapter ring having outboard and inboard radial faces and provided with a corresponding annular series of openings, said ring spacing certain of said wheel bodies, and means for demountably securing said wheel bodies and adapter ring together and to said hub flange, said means comprising an annular series of fastenings secured to the hub flange and extending through the aligned openings in the mounting portions of said wheel bodies and said adapter ring, each fastening comprising a member having threaded engagement at its inboard end with cooperating means carried by the hub flange and having an abutment for engagement with the adjacent wheel body, said member extending through the aligned openings in the adapter and the wheel body or bodies mounted on the outboard radial face of said adapter and having screw-threaded engagement with a second member having an abutment for engagement with the outboard face of said wheel body or bodies.

PAUL E. BAKER.

REFERENCES CITED

The following references are of record in the file of this patent:

UNITED STATES PATENTS

| Number | Name | Date |
| --- | --- | --- |
| 1,606,077 | Johnson | Nov. 9, 1926 |
| 1,297,243 | Putnam | Mar. 11, 1919 |
| 1,775,008 | Waters | Sept. 2, 1930 |
| 1,948,136 | Scheckler | Feb. 20, 1934 |
| 1,721,278 | Nelson | July 16, 1929 |
| 2,259,022 | Clark | Oct. 14, 1941 |